Feb. 20, 1968   H. G. HIGGS   3,369,394
METERS FOR NON-CONDUCTING LIQUIDS
Filed Dec. 23, 1964   4 Sheets-Sheet 3
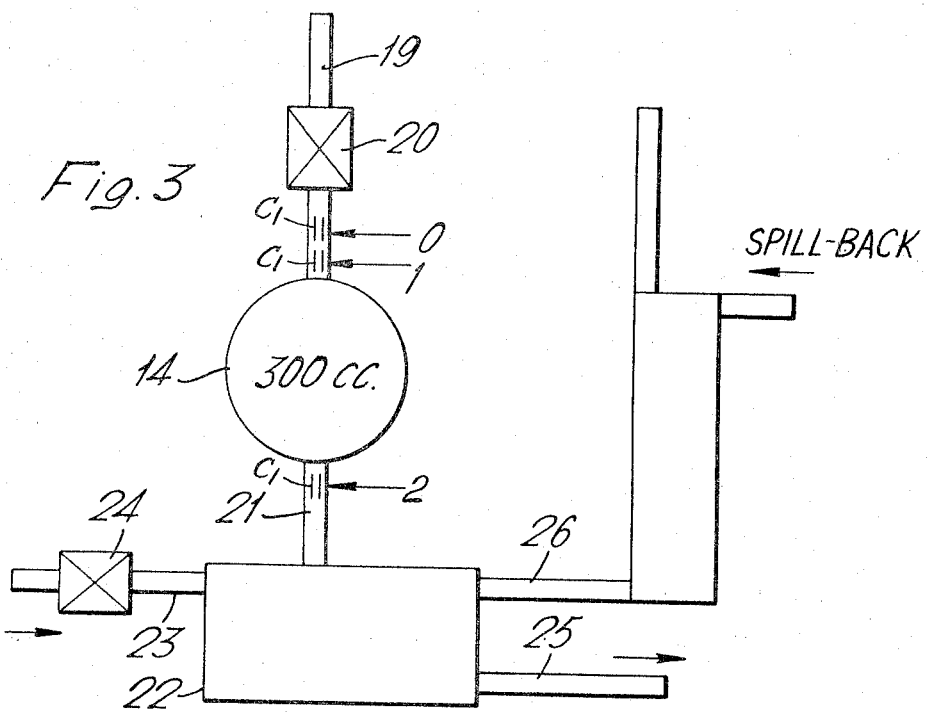
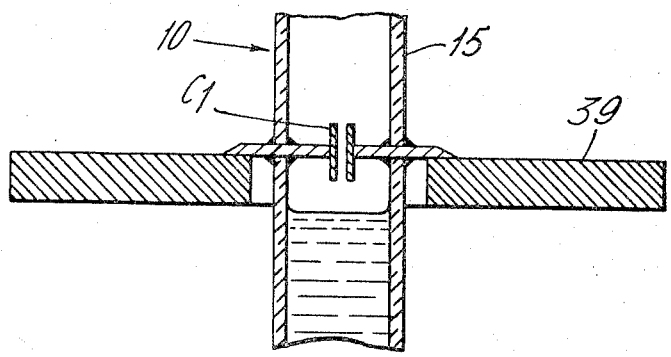

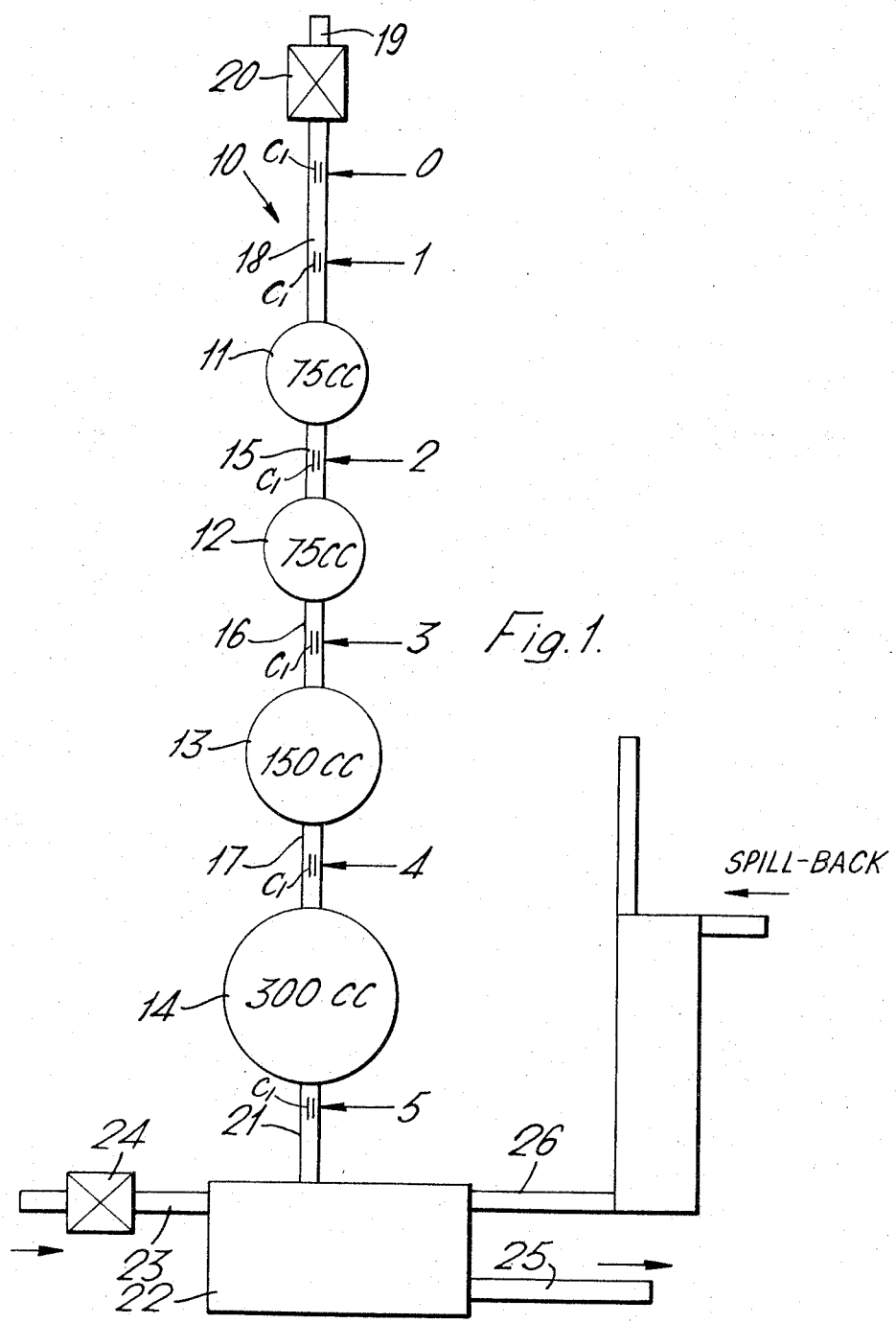

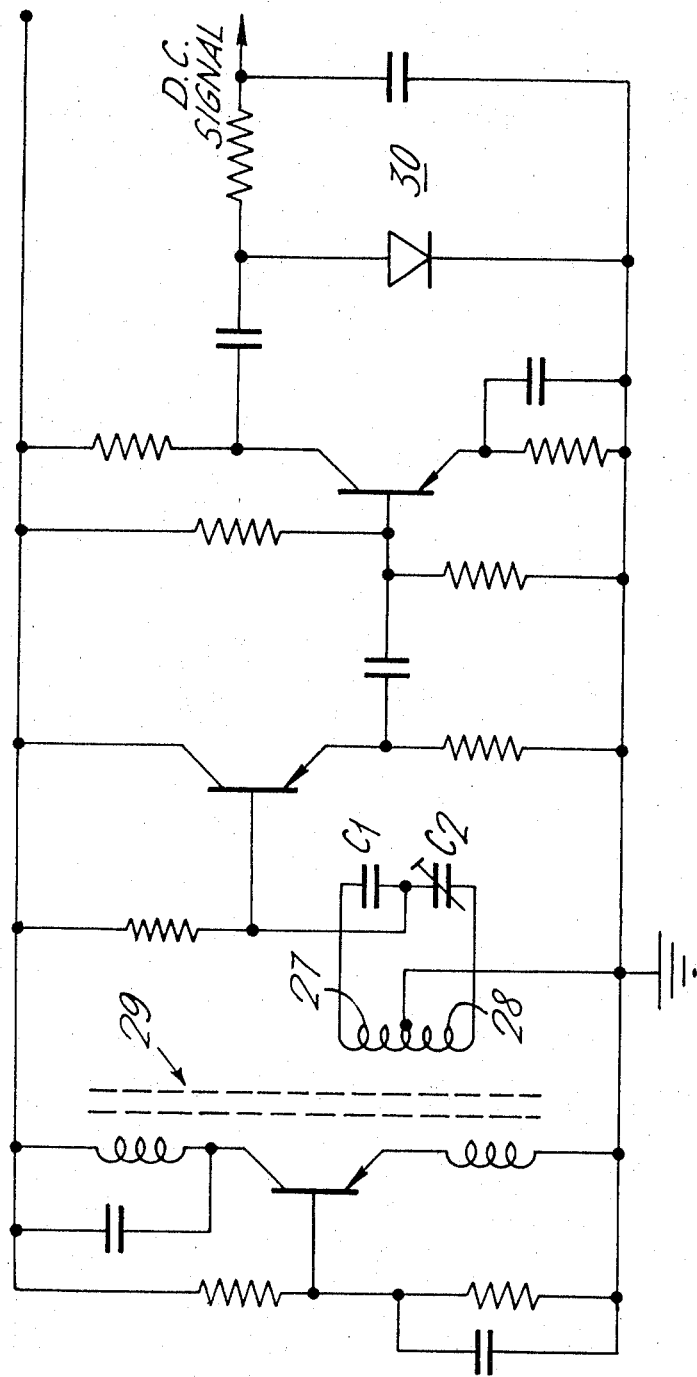

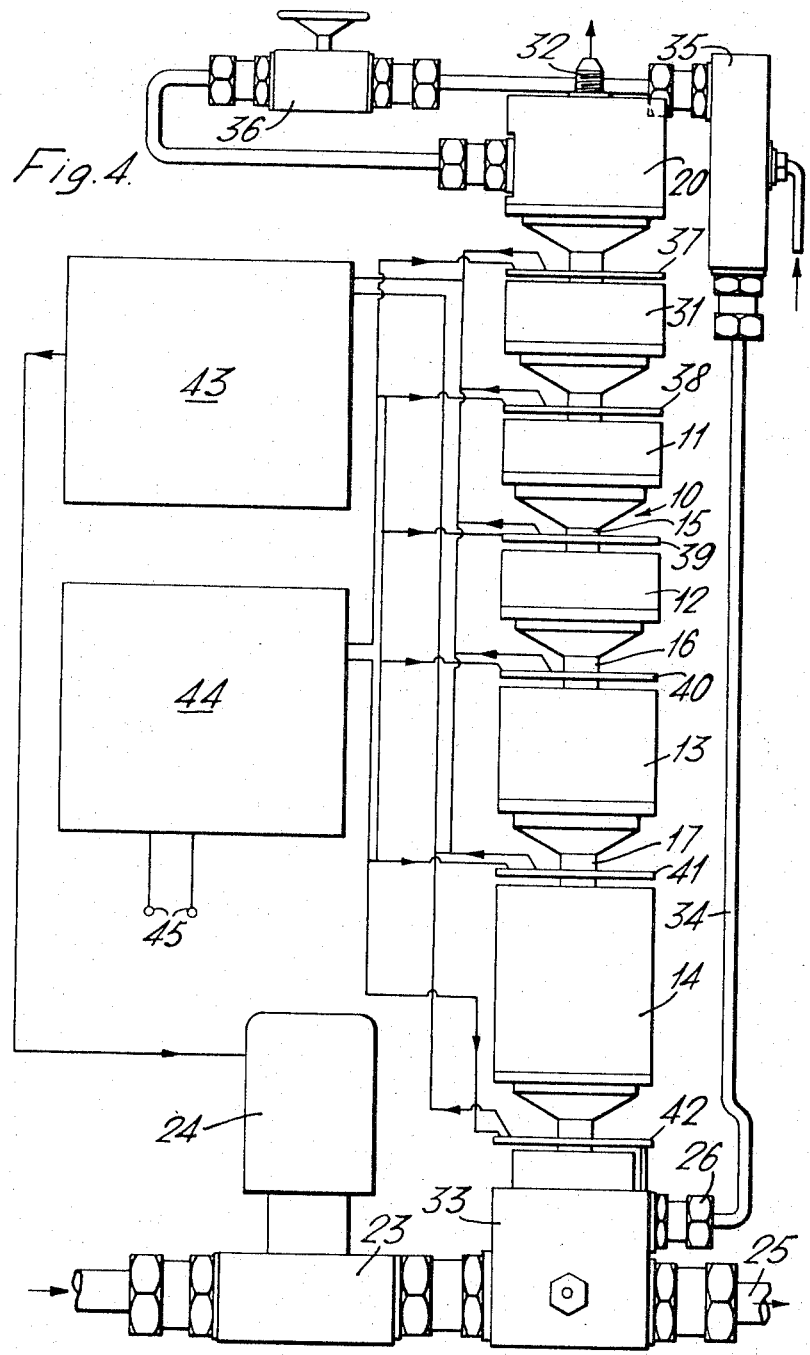

3,369,394
Patented Feb. 20, 1968

3,369,394
METERS FOR NON-CONDUCTING LIQUIDS
Harry Goldsworthy Higgs, 2 Wensleydale,
Luton, Bedfordshire, England
Filed Dec. 23, 1964, Ser. No. 420,494
Claims priority, application Great Britain, Jan. 1, 1964, 32/64
3 Claims. (Cl. 73—113)

ABSTRACT OF THE DISCLOSURE

The invention is a liquid metering device, primarily for metering fuel to engines under test, in which a column consisting of one or more accurately calibrated chambers opens at its lower end into a fuel reservoir and is vented at its upper end to atmosphere, preferably through a valve. An outlet from the reservoir leads to the engine under test, while a spill-back circuit from the engine pump is connected back to the reservoir under pressure equilibrium conditions. A fuel supply pipe feeds the reservoir through a solenoid-operated inlet valve. A series of capacitor probes are accurately positioned on the column, preferably at narrow-bore sections, for sensing the presence of an interface between the fuel and the air or the like above it in the column. The probes trigger a timer and circuits for opening and closing the inlet valve.

---

This invention relates to meters for non-conducting liquids and more particularly (although not exclusively) to meters for hydrocarbon fuels. Such meters are commonly used in connection with internal combustion engine tests, and it is an object of the present invention to provide a meter which is both accurate and versatile as regards the composition of the liquid.

In one known form of meter, a calibrated column (usually termed a burette) consisting of a plurality of chambers, each of predetermined volume, interconnected by short, relatively narrow bore passages has its bottom end immersed in a reservoir of electrolyte and its upper end connected to the fuel pump of an internal combustion engine. A pair of conducting probes is sealed into the wall of each passage at successive volume calibrations and connected to a conductivity detector. The column or burette is initially filled with fuel, and as this is consumed, the electrolyte rises in the column, so that a change of conductivity occurs as the fuel/electrolyte interface traverses each gap between a pair of probes. By timing the intervals between successive resultant signals, the rate of fuel consumption of the engine is determined.

The known instrument operates quite satisfactorily for a narrow range of fuels, but it is found that errors arise when, for example, the fuel is changed from high-octane petrol to diesel oil, due to solubility effects of the electrolyte in the heavier fuel. Hence, either different columns must be used for different fuels, or the electrolyte must be changed with each change of fuel, with the consequent delays and inconvenience.

In a meter for non-conducting liquids according to the present invention, the electrolyte is substituted by a fluid—which may be air, an inert gas, or another non-conducting liquid—which has a substantially different dielectric coefficient from the liquid being metered, and capacitor probes are used at each calibration level. These probes are each connected to a detector, such as an A.C.-energized bridge circuit, which is responsive to changes in the capacitance of the capacitor probe as the fuel/air (or other fluid) interface traverses the respective calibration level.

Preferably, the probes are connected to an amplifier the output from which is arranged to trigger a timer.

The invention is particularly applicable to measuring fuel consumption in compression ignition and other fuel injection engines, wherein the engine fuel pump normally operates on a basis of variable spill-back, whereby part of the volume of fuel pumped is by-passed to source depending on the speed and load conditions under which the engine is working. This spill-back must be accounted for with the same volumetric accuracy, and the same accuracy for timing, as the supply from the source. In accordance with the invention, the amount of the spill-back fuel is returned to the fuel reservoir at the bottom of the calibrated column and thus is accurately accounted for because it is returned to and timed by the same metering system as the source of supply to the engine pump.

Two embodiments of the invention, suitable for metering hydrocarbon fuel in engine test bays, will now be described, by way of illustration only, with reference to the accompanying drawings, in which:

FIGURE 1 is a diagram of the fluid circuit of a meter according to the present invention;

FIGURE 2 is a circuit for deriving a D.C. signal from a capacitor probe of FIGURE 1;

FIGURE 3 is a diagram of the fluid circuit of a modified fuel meter;

FIGURE 4 is a partly diagrammatic illustration of a complete fuel meter having the fluid circuit of FIGURE 1; and FIGURE 5 is an enlarged cross section of a detail, showing a capacitor probe.

Referring first to FIGURES 1 and 5, a column or burette 10 consists of four chambers 11, 12, 13, 14 (any other number could be chosen according to specific requirements) each of accurately known and controlled volume. The chambers are interconnected by short, relatively narrow bore passages or necks 15, 16, 17, the upper chamber 11 also communicating, through a longer passage 18, with a vent 19 through a vent valve 20 whilst the lowest chamber 14 communicates through a short passage 21 with a fuel reservoir 22.

At each of a series of calibration levels, marked 0, 1, 2, 3, 4, and 5, on the various passages, a pair of capacitor electrodes $C_1$ project through the wall of the respective passage so as to be exposed to the atmosphere (fuel, air, gas, or contrasting liquid) within the passage. In a practical example, using an A.C. supply at 500 kc./s., the bores of the passages 15, 16, 17, 18, 21 were of just over 1 sq. cm. cross-sectional area and the capacitor probe electrodes were plates spaced apart by $\frac{1}{32}$-inch and measuring $\frac{1}{8}$-inch lengthwise of the passage. Such a probe has a capacity of 3.5 pF in air, and can produce, at the output of an amplifier, a voltage change from 500 millivolts peak-to-peak to 5 volts peak-to-peak as a petrol/air interface traverses the probe. Similar values were obtained with paraffin and transformer oil.

The reservoir 22 is closed, and has a fuel inlet 23 controlled by a solenoid-operated burette valve 24, a fuel outlet 25, and a spill-back return connection 26, the latter being vented through the vent valve 20. The valve 20 is provided simply as a protection against malfunctioning of the equipment or engine back pressure, and plays no part in the normal operation of the system.

Each probe at the different calibration levels 0 . . . 5 is coupled to its own bridge amplifier circuit such as that shown in FIGURE 2. The bridge circuit has its ratio arms 27, 28 constituted by the halves of the center-tapped secondary of a transformer 29 connected across the supply, and its measuring arms constituted by the respective probe $C_1$ and an adjustable capacitor $C_2$, the adjustment of which is used to balance the bridge. The output of this bridge is fed into a transistorized amplifier having a half-wave rectifier and smoothing circuit 30 across its output. The D.C. outputs from all the bridge amplifier circuits can be fed to a selector switch in order that any given volume within the range provided by the column or burette 10 can be preselected for delivery under automatic control, or in order that the time occupied in the consumption or delivery of the given volume can be automatically measured with a high degree of accuracy.

In a modification of the invention, the column consists of a single chamber 14, as shown in FIGURE 3, having short and relatively narrow bore inlet and output passages. The inlet passage communicates with a vent 19 through vent valve 20 and the outlet passage communicates with a reservoir 22. As in the preceding example, the reservoir 22 has a fuel inlet, controlled by solenoid valve 24, a fuel outlet 25, and an overspill return connection 26. Capacitor probes $C_1$ are positioned at calibration levels 0, 1, and 2.

FIGURE 4 shows the column 10 consisting of the four chambers 11, 12, 13, 14, which are interconnected by short necks 15, 16, 17, and surmounted by a chamber 31 which provides a header volume. This chamber communicates with a vent 32 via a float-controlled vent valve 20. The lower end of the column is connected to a fuel reservoir in a manifold block 33. The reservoir has a fuel inlet 23, which is controlled by solenoid valve 24, a fuel outlet 25, and a spill-back return connection 26 leading via a pipe 34 to a deaeration chamber 35. The outlet of the deaeration chamber 35 is connected via a manually controlled stop valve 36 to the chamber of the float valve 20. The capacitor probes are mounted at positions corresponding to the calibration levels 0, 1, 3, 4, 5 of FIGURE 1, at which are located printed circuit boards 37, 38, 39, 40, 41, 42 carrying the bridge amplifier circuits for the respective probes. A control box 43 houses the selector switch and timer, and the power supplies for the bridge amplifiers are derived from a power unit 44 having a mains input 45. The electrical connections between the power unit, control box and capacitor probes are indicated diagrammatically in the drawing.

In use in, say, an internal combustion engine test bay, fuel is admitted to the column or burette 10 through the burette valve 24 until a signal is obtained from the top probe at calibration level 0. As soon as an engine test is to be started, the vent valve 20 is opened and fuel passes through the line 25 to the fuel pump. This part of the circuit is normally already full of fuel, but some make-up may be necessary from time to time, the fuel/atmosphere interface being automatically maintained at the datum level 0 by operation of the solenoid valve in accordance with signals from the top probe. When the engine has been started and run up to the required test conditions of temperature, speed and load, the metering operation is allowed to commence by muting i.e. closing the solenoid valve 24. The engine now draws fuel from the burette 10 and the fuel/atmosphere interface descends from the datum level. Moreover, during the test, the spill-back from the fuel pump on the engine is returned to the fuel reservoir at the bottom of the calibrated column and is thus accounted for in the metering operation. As the fuel/atmosphere interface leaves the level marked by the zero probe at level 0, a warning signal is derived from the particular circuit 27 . . . 30 associated with the zero probe, to indicate that steady test conditions must be maintained. As the interface passes the test starting probe at level 1, the timer is triggered, and continues to run until the interface passes the test ending probe at the preselected one of the levels 2, 3 . . . at which the test is to end. A second trigger signal is then derived from the appropriate probe circuit 27 . . . 30 to stop the timer.

By way of example, when the timer is an electric timer, the second trigger signal effects opening of a contact in the energizing circuit of the timer, the trigger signal exerted by the capacitor probe at level 1 having effected energization of the said circuit.

I claim:

1. Apparatus for determining measured volumes of liquid fuel consumed by an engine, comprising a closed fuel reservoir having an inlet and an outlet, a calibrated column having a connection to said reservoir, said column having at least two distinct levels and between which is a chamber defining a predetermined volume, a capacitor probe located at each of said levels and having a capacitance which varies in dependence on whether the fuel level in the column is above or below the said level, a capacitance measuring circuit in respect of each probe, circuit means for deriving from each measuring circuit an output signal consequent upon the passage of the fuel level in said column downwardly past the respective probe, a solenoid operated valve for controlling the delivery of fuel through the reservoir inlet, a vent at the upper end of the column, a vent valve controlling the vent, a spill-back connection from the fuel pump on the engine communicating with said reservoir at equilibrium pressure and a deaeration chamber disposed in said spill-back connection to said reservoir.

2. Apparatus for determining measured volumes of liquid fuel consumed by an engine comprising a closed fuel reservoir having an inlet and an outlet, a calibrated column having a connection to said reservoir, said column having a plurality of chambers each of known volume disposed in series one below the other and connected in series in said column by narrow passages; an upper passage connected to the top of the uppermost of said chambers; a spill-back return pipe connected to said upper passage; a lower passage connected to the bottom of the lowermost of the said chambers; capacitor probes respectively associated with all said passages; a timing device; starting means operative to start said timing device under control of an output signal from the circuit means of a capacitor probe at a higher level upon passage of fuel downwardly past said probe; selector switching means for selecting for operation the circuit means of a capacitor probe at a lower level whereby to select the liquid level at which the timing device is stopped, and stopping means operative to stop said timing device under control of an output signal from the selected circuit means.

3. Apparatus as defined in claim 2 for determining measured volumes of liquid fuel consumed by an engine wherein said upper passage to which said spill-back return pipe is connected is constituted by a header volume chamber above and communicating with the uppermost one of said chambers of known volume and a float-operated vent valve located above and in communication with said header volume chamber, said spill-back return pipe being connected to the float chamber of said vent valve.

References Cited

UNITED STATES PATENTS

| 1,790,968 | 2/1931 | Baulino | 73—113 |
| 2,625,933 | 1/1953 | Salisbury | 73—223 |
| 2,697,939 | 12/1954 | Martin et al. | 73—113 |
| 2,876,639 | 3/1959 | Loizzo et al. | 73—113 |
| 2,927,461 | 3/1960 | Welch et al. | 73—113 |
| 3,000,207 | 9/1961 | Goffe | 73—113 |
| 3,010,320 | 11/1961 | Sollecito | 73—304 |

FOREIGN PATENTS

| 1,228,173 | 3/1960 | France. | |

RICHARD C. QUEISSER, *Primary Examiner.*

JAMES J. GILL, *Examiner.*

E. D. GILHOOLY, *Assistant Examiner.*